United States Patent Office 3,453,588
Patented July 1, 1969

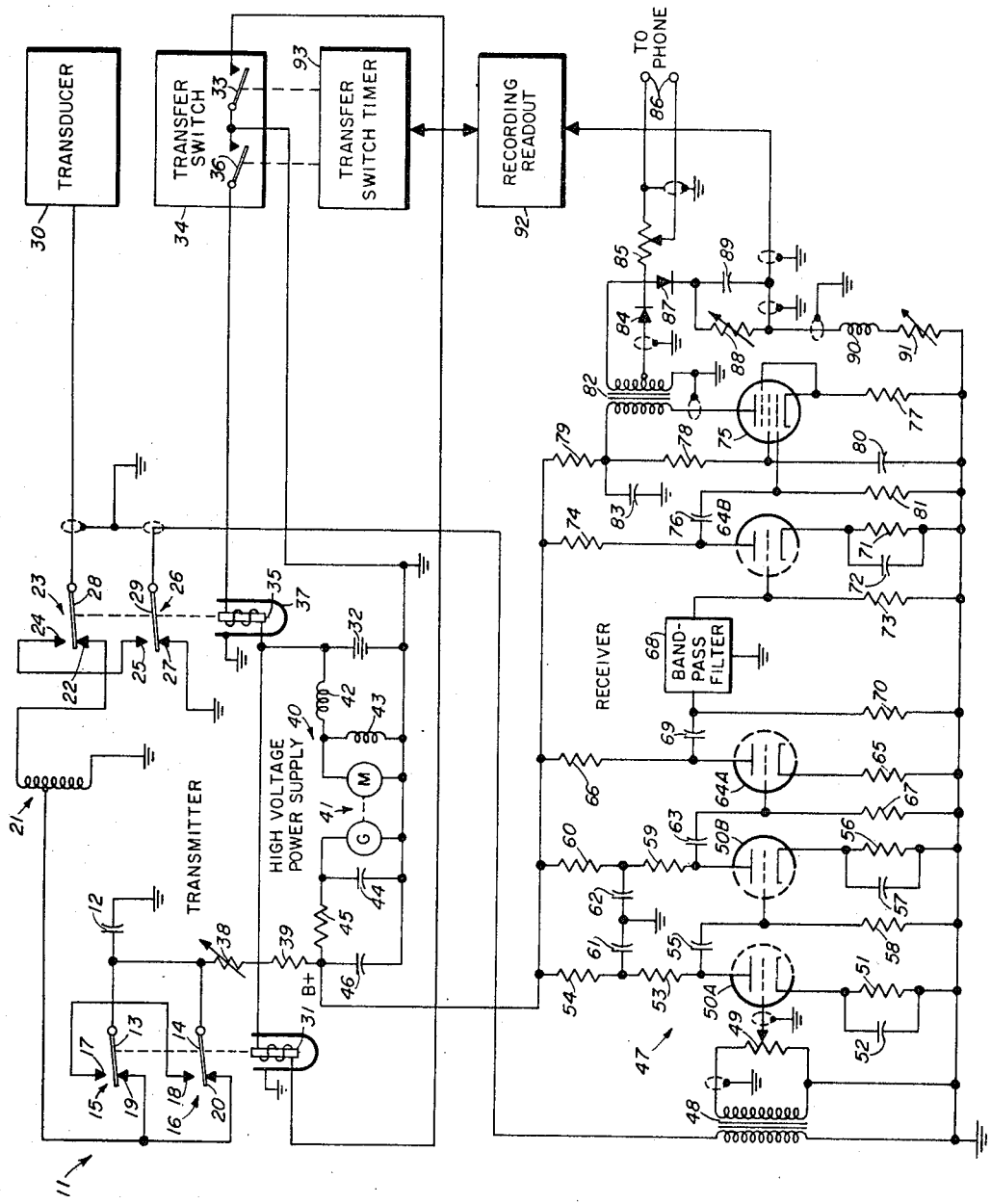

3,453,588
SMALL BOAT SONAR
Louis R. Padberg, Jr., Fred D. Parker, and Merwin R. Markland, San Diego, Calif., assignors to the United States of America as represented by the Secretary of the Navy
Filed Dec. 28, 1959, Ser. No. 862,430
Int. Cl. G01s 9/66
U.S. Cl. 340—3       11 Claims The invention described herein may be manufactured and used by or for the Government of the United States of America for governmental purposes without the payment of any royalties thereon or therefor.

This invention relates generally to underwater sound and detection systems of the echo-sounding character and in particular relates to a sonar system adapted to be used to an advantage on small boats.

The need for a simple sonar suitable for use on small boats has been recognized repeatedly and, although various efforts have been made to develop such a system, the actual devices resulting therefrom have neither provided acceptable operational performance nor contained physical or structural characteristics necessary for carrying out naval and military missions in a satisfactory manner. For example, inasmuch as presently existing sonar systems weigh as much as 1600 pounds or more and are quite voluminous, they require vessels of three hundred tons or more to accommodate them. For the most part, this has hampered sonar surveillance in many sensitive areas, such as harbors, due to the necessity of allocating ships of such sizes to other duties for more advantageous tactical reasons.

The potential increase of defense operations resulting from the use of small crafts such as motor torpedo boats, picket boats, fishing boats, and yachts, if properly equipped with this invention, would be considerable indeed, particularly around harbor and amphibious landing areas. Because the subject invention enables such small craft to be used in conjunction therewith to an advantage, it is a vast improvement over the prior art for this purpose. This is particularly true because the system constituting this invention is a small, simple, light weight, general purpose sonar which is relatively inexpensive to manufacture, easily installed and maintained, and rugged in structure. It is simple to operate and provides suitable beam patterns for locating small objects or acting as a depth sounder in noisy or poor echo-ranging environments with only moderate attenuation.

It is, therefore, the primary object of this invention to provide an improved sonar system that is simple, reliable, and light in weight which may be readily installed on a variety of small craft for use in restricted areas.

Another object of this invention is to provide a sonar system for locating and measuring the range of small objects.

Another object of this invention is to provide a simple means for making depth soundings and measurements.

A further object of this invention is to provide a simple sonar system that will operate effectively in noisy and poor echo-ranging environments.

A still further object of this invention is to provide a lightweight sonar system that will produce suitable predetermined beam patterns.

Another object of this invention is to provide a relatively simple sonar system that fulfills predetermined range requirements with only moderate signal attenuation.

Another object of this invention is to provide a small sonar system which transmits and receives very short pulses.

A further object of this invention is to provide a simple sonar transmitter which utilizes capacitor discharge transmitting techniques.

Last, but not least, it is an object of this invention to provide a small boat sonar that is easily and economically manufactured and maintained.

Other objects and many of the attendant advantages of this invention will be readily appreciated as the same becomes better understood by reference to the following detailed description when considered in conjunction with the accompanying drawing wherein:

The single figure depicts a schematic diagram, partly in box form, of a preferred embodiment of the device constituting this invention.

Referring now to the drawing, wherein like reference characters designate like or corresponding parts throughout the view, there is shown an intelligence signal transmitter 11 having a storage capacitor 12 connected between ground and electrically and physically interconnected movable arms 13 and 14 of relay switches 15 and 16. Upper contacts 17 and 18 of relay switches 15 and 16 are coupled to each other and lower contacts 19 and 20 of relay switches 15 and 16 are connected together in order to promote sharp switching action with minimum contact bounce during rapid operation. Because the exactness of contact timing is of considerable importance, this particular switch arrangement is employed in the preferred embodiment of this invention, although use of any other appropriate switching arrangement would not violate the spirit and teachings thereof. In many instances, however, it has been found to be desirable to mercury-wet the relay switch contacts to further assist in preventing the occurrence of any contact bounce or chatter and, in addition, to promote increased reliability and life expectance of the subject equipment.

Lower relay switch contacts 19 and 20 are connected at a tapped position on audio transformer 21, the primary of which is connected to ground and the secondary of which is coupled to a lower contact 22 of a relay switch 23. An upper switch contact 24 of relay switch 23 is coupled to an upper contact 25 of a relay switch 26. A lower contact 27 of relay switch 26 is grounded. Movable arms 28 and 29 of relay switches 23 and 26 are structurally ganged together for simultaneous physical movement. Movable arm 28 of relay switch 23 is electrically coupled to a reversible transducer 30.

Relay switches 15 and 16 are actuated by a relay solenoid 31 connected across a low voltage power source 32 such as a battery or the like through contacts 33 of a transfer switch 34. In order to prevent stray currents and magnetic fields from permeating and adversely interfering with the operation of the remainder of the system, a grounded shield is appropriately disposed around solenoid 31. Although it is not so illustrated in the drawing, said shield may be extended to include the relay switches actuated by said solenoid if so desired.

Relay switches 23 and 26 are actuated by a solenoid 35 energized by low voltage source 32 through contacts 36 of transfer switch 34. Solenoid 35 is likewise isolated electrically and magnetically from the remainder of the subject system by means of a grounded shield 37 which also may be disposed so as to include relay switches 23 and 26 if determined to be preferable for optimum performance under any given operational circumstances.

Movable arms 13 and 14 of relay switches 15 and 16 as well as the ungrounded plate of capacitor 12 are coupled through series connected resistors 38 and 39 to a high voltage B+ power supply 40 which, in turn, includes a motor-generator energized by the aforesaid low voltage source 32 through an inductance 42 connected in series to reduce the dynamotor noise reflected back into the power leads. An inductance 43 shunts the input of the motor portion thereof. The output voltage of the generator portion of said motor-generator is filtered by means of a pi-filter circuit, including a capacitor 44, a resistor 45, and a capacitor 46.

Movable arm 29 of relay switch 26 is connected to the input of a three tube receiver 47 at one terminal of the primary winding of a triple-shielded input transformer 48, the other primary terminal of which is grounded. Connected across the terminals of the secondary winding is a variable voltage gain control 49 of the potentiometer type with one terminal thereof likewise grounded. The movable arm of voltage divider potentiometer 49 is coupled to the grid of a triode amplifier 50A. The cathode of triode 50A is connected to ground through a resistor 51 shunted by a capacitor 52, and the plate thereof is coupled to B+ through series connected resistors 53 and 54.

The plate output of triode 50A is coupled to the grid of another triode amplifier 50B through a capacitor 55. The cathode of triode 50B is connected to ground through a resistor 56 shunted by a capacitor 57. Appropriate bias therefore is obtained by means of a resistor 58 interconnecting the grid of triode 50B and ground. The plate of triode 50B is connected to B+ through a pair of series connected resistors 59 and 60. Connected between the common junctions of resistors 53 and 54 and resistors 59 and 60 are a pair of series connected capacitors 61 and 62 of which the common junction thereof is grounded.

The output of triode 50B is coupled through a capacitor 63 to the grid of a triode 64A. The cathode and plate of triode 64A are respectively connected to ground and B+ through resistors 65 and 66. Bias voltage is furnished to triode 64A by means of a resistor 67 interconnecting the grid thereof and ground.

The plate output of triode 64A is RC coupled to a bandpass filter 68 of the order of 29.0 kc. center frequency with a 5 kc. width by means of a capacitor 69 and a resistor 70. Although the above bandpass filter characteristics were found to be pertinent to the preferred embodiment of this invention, it is to be understood that the invention is not intended to be limited thereto and that any appropriate bandpass characteristics may be employed as deemed necessary for optimum operation under any given set of environmental parameters or conditions.

The output of bandpass filter 68 is coupled to the grid of a triode amplifier 64B. The cathode of triode 64B is connected to ground through a resistor 71 with a capacitor 72 connected in parallel therewith. A bias resistor 73 is coupled between said grid and ground. The plate of triode 64B is coupled to B+ through a resistor 74 and to the control grid of a pentode 75 through a capacitor 76. The cathode of pentode 75 is connected to the suppresser grid thereof and to ground through a resistor 77. The screen grid thereof is connected to B+ through a pair of series connected resistors 78 and 79 and to ground through a capacitor 80. Bias voltage is furnished pentode 75 by means of a resistor 81.

The plate output of pentode 75 is coupled to the common junction of series resistors 78 and 79 through the primary winding of an output transformer 82. Said common junction is also coupled through a capacitor 83 to ground. The secondary winding of transformer 82 is tapped with a detector diode 84 connected thereat. A potentiometer 85 is coupled between said diode and ground with the movable arm thereof connected to one terminal of phone jack 86, the other terminal of which is grounded. The other two terminals of said transformer secondary winding are respectively connected to ground and to the input of a detector diode 87, the output of which is series-coupled through a tunable parallel RC circuit including an adjustable sensitivity reference control resistor 88 and a capacitor 89, through an inductance 90, and through another variable resistor 91 to ground. The latter mentioned inductance 90 and variable resistor 91 are serially combined to act as an adjustable contrast circuit, inasmuch as they cooperate to appropriately bypass the unwanted low frequency signals, if any, to ground while allowing the desired power frequency signals to be passed on to recording readout 92.

The output is taken from the common junction of said tunable parallel RC circuit and said inductance and is fed to the stylus of a recording readout 92 where it is indicated and recorded as desired.

Interconnecting the aforesaid transfer switch 34 and recording readout 92 is a transfer switch timer 93 for causing the transmitter and receiver to be timely activated in appropriate synchronization with the recording readout in order to obtain substantially optimum effectiveness of the entire system constituting this invention.

Having structurally described the subject invention in detail, the operation of the system constituting same is briefly explained as follows:

During the transmission portion of the operating cycle, the receiver is inactive; that is, the receiver is inactive for the purpose of receiving intelligence signals from the transducer because it is disconnected therefrom at that time. For the sake of simplicity, relay switches 15, 16, 23 and 26 are all illustrated as being in the down position during the transmission period. Hence, it should be understood that of necessity they would all be in the up position during the reception period.

When transmitting, the transducer is connected through relay switch 23, transformer 21, and relay switches 15 and 16 to storage capacitor 12 and is energized thereby by the electric charge stored therein during the receiving portion of the operation, as will be explained more fully below. When, for example, a 1-microfarad capacitor is used as the storage capacitor in conjunction with the composite Q of an appropriate transducer and related relay networks, the transmitted pulse length may be designed to be approximately 0.3 millisecond—a pulse sufficiently short to discern and substantially identify small objects such as buoys, kelp, swimmers using self-contained underwater breathing apparatus, mines and small craft, as well as large craft, submarine boats, shore lines and bottom reflections.

In order to cause intelligence signal transmission to occur as a result of effectively connecting capacitor 12 to transducer 30, said relay switches must be timely actuated by their respective solenoids. For example, assuming that relay switches 15, 16, 23 and 26 are in the up position when their respective solenoids 31 and 35 are energized, such energization can be effected by the timely closing of contacts 33 and 36 of transfer switch 34. Obviously, however, it should be understood that whether said relay switches are up or down when solenoids 31 and 35 are energized is merely a matter of choice—a choice which may be made to provide proper operation thereof and associated circuits without violating the teachings and spirit of this invention. Contacts 33 and 36 of transfer switch 34 may be actuated for changing the subject sonar system from transmit to receive conditions and vice versa by transfer switch timer 93 in accordance with any predetermined program. The timing of the actuation of contacts 33 and 36 will, of course, be influenced by many factors such as, for instance, impedance characteristics of the entire system as well as its various circuit components, the physical characteristics of the various components, especially those involving moving parts, the type of intelligence signals to be broadcast or received, and others. To produce such proper predetermined timing it has been found expedient to use commutator and slip ring type interrupters, although use of cam operated micro-switches or appropriate relays produce results which are substantially as satisfactory.

Transfer switch 34 is synchronized with recording readout 92 so that both the transmitted signals and the received signals may be recorded appropriately in some related manner to facilitate analysis and interpretation thereof.

When the subject sonar is in the receive condition, the output of transducer 30 is connected through relay switches 23 and 26 to receiver 47 where it is properly transformed and amplified within input stages that provide fairly high gain with relatively low internal noise. The 5 kc. wide bandpass filter with a center frequency of 29.0 kc. is inserted ahead of the output amplifier stage in order to substantially eliminate passage of unwanted signals and reduce intermodulation distortion which, of course, improves considerably the signal to noise ratio and results in improved intelligence signal fidelity. The pentode output stage operating in conjunction with the output transformer provides desirable impedance matching with the recording readout input circuit.

As previously mentioned, the ungrounded plate of capacitor 12 is connected directly to movable relay arms 13 and 14 and indirectly to B+ through resistors 38 and 39. During the receiving operation, said capacitor charges according to the time constant obtained from the selected values of the RC circuit containing said capacitor 12 and said resistors 38 and 39. But during the transmission operation, while capacitor 12 is being discharged through movable arms 13 and 14, said arms are substantially isolated from the charging B+ voltage by the aforesaid resistors 38 and 39, thus causing said B+ voltage to have no adverse effects on the transmission operation at that time.

Throughout the various and sundry elements, components and interconnecting circuitry of the preferred embodiment of the invention depicted in the single figure, shielding is liberally employed as necessary to prevent adverse interference therebetween. The type and extent of such shielding, of course, is contingent upon the structural relationship of the individual parts, the operating frequencies, and other parameters familiar to the artisan; however, the teaching of such shielding being utilized in conjunction with the herein disclosed unique combination of said parts should be understood as being included within the spirit and scope of the subject invention.

Likewise, although it is not illustrated in the drawing, solenoid stabilizing expedients, such as shunting capacitors placed across the solenoid coils, may be employed to reduce relay switch chatter in order to provide improved signal transfer between the contacts thereof.

Obviously, many modifications and variations of the present invention are possible in the light of the above teachings. It is, therefore, to be understood that the invention may be practiced otherwise than as specifically described above.

What is claimed is:

1. A small boat sonar system comprising in combination a receiver, recording readout means connected to the output of said receiver, a transfer switch timer connected to said recording readout means, a transfer switch connected to said transfer switch timer for synchronized actuation by said recording readout means, means for storing a predetermined intelligence signal, means connected to said storing means for charging same with said intelligence signal, means connected to said storing means and said charging means for discharging said storing means and producing a first output signal proportional thereto, means coupled to said discharging means for transforming said first output signal to a second output signal proportional thereto in frequency and amplitude, a transducer means, said transducer means adapted to broadcast acoustical energy upon excitation by and in proportion to said second output signal and generate an electrical signal upon excitation by acoustical energy and in proportion therewith, and means coupled to said transfer switch for connecting said transducer means to said transforming means for response to said second output signal during the time said predetermined intelligence signal storing means is being discharged by said discharging means and for coupling said transducer means to said receiver during the time said predetermined intelligence signal storing means is being charged by said charging means.

2. The invention according to claim 1 wherein said means for storing a predetermined intelligence signal comprises a capacitor.

3. A small boat sonor system comprising in combination a receiver, a recording readout connected to the output of said receiver, a transfer switch, means interconnecting said recording readout and said transfer switch for synchronizing the operations thereof, a storage capacitor, a power supply connected to said storage capacitor for charging same, a first relay switch connected to said storage capacitor and said power supply for discharging said storage capacitor and producing a first output signal, a transformer coupled to said first relay switch for response to said first output signal, a reversible transducer, and a second relay switch coupled to said transfer switch for connecting said reversible transducer to the output of said transformer during the time said storage capacitor is being discharged and for coupling said reversible transducer to said receiver during the time said storage capacitor is being charged.

4. A small boat sonar system comprising in combination a receiver including an input transformer, means coupled to the output of said transformer for amplifying the signal therefrom, means connected to the output of said amplifying means for passing signals within a predetermined band width, means coupled to said predetermined signal passing means for amplifying the signals passed thereby, a first diode, an output transformer having a primary winding and a tapped secondary winding, said primary winding being connected for energization by the output from said last mentioned amplifying means and said secondary winding interconnecting a ground and said first diode, a variable sensitivity control circuit coupled to the output of said first diode, an adjustable contrast circuit having a series connected inductance and variable resistance coupled between the output of said variable sensitivity control circuit and said ground, a recording readout coupled to the output of said sensitivity control and contrast circuits, a second diode connected to the tap of the secondary winding of said output transformer, earphone jacks, means interconnecting the output of said second diode and said earphone jacks for varying the signal gain thereto, a transmitter, a transducer, and means synchronized with said recording readout for timely connecting said transducer to said transmitter and the input transformer of said receiver.

5. The device of claim 4 in which said means connected to the output of said amplifying means for passing signals within a predetermined band width is a five kilocycle per second bandwidth filter with a center frequency of twenty-nine kilocycles per second.

6. The device of claim 4 wherein said transmitter includes means for storing an electric charge, means connecting to said electric charge storing means for charging same, and means connected to said electric charge storing means and said charging means for discharging said electrical charge storing means when said transducer is connected to said transmitter.

7. The invention according to claim 4 wherein said variable sensitivity control circuit coupled to the output said first diode comprises a parallel connected variable resistor and capacitor.

8. The device of claim 6 wherein said means for storing an electric charge comprises a capacitor.

9. A small boat sonar system comprising in combination a transducer adapted to broadcast acoustic energy within an aqueous medium upon excitation by an electric charge and produce an electrical output signal upon excitation of acoustic energy received from said aqueous medium, a first relay switch means having a first pair of contacts, a movable arm adapted to alternately contact same, and a first solenoid for actuating said movable arm, capacitance means coupled between ground and the aforesaid movable arm of said first relay switch means at an electrical junction, means for supplying electrical power, resistance means connected between said electrical power supplying means and the movable arm of said first relay switch means, an output transformer having a primary winding and a secondary winding, said primary winding being coupled between one contact of said first pair of contacts and a ground, a second relay switch means having a first, second, third, and fourth contacts, a pair of movable arms including a first movable arm adapted to alternately contact said first and second contacts and a second movable arm ganged with said first movable arm for simultaneous movement therewith adapted to alternately contact said third and fourth contacts, and a second solenoid for actuating said pair of movable arms, said output transformer secondary winding being connected between ground and the second contact of said second relay switch means, said transducer being connected to the first movable arm of said second relay switch means, said first and third contacts of said second relay switch means being connected together and said fourth contact thereof coupled to said ground, a receiver, said receiver having its input connected to said second movable arm, a recording readout, an impedance matching means interconnecting the output of said receiver and the input of said recording readout, and means connected to said recording readout, said electrical power supplying means, and said first and second solenoids for appropriately actuting all of said movable arms to effect connecting said capacitance means and said receiver to said transducer during the operations of broadcasting and receiving said acoustic energy, respectively.

10. The invention according to claim 9 further characterized by a variable sensitivity control circuit interposed between the output of said impedance matching means and the input of the aforesaid recording readout.

11. The invention according to claim 10 further characterized by an adjustable contrast circuit connected between the input of said recording readout and ground.

References Cited

UNITED STATES PATENTS

| | | | |
|---|---|---|---|
| 2,710,388 | 6/1955 | Chun | 340—3 |
| 2,428,799 | 10/1947 | Hayes et al. | 340—3 |
| 2,431,854 | 12/1947 | Wood | 340—3 |
| 2,561,851 | 7/1951 | Fryklund | 340—3 |
| 2,901,726 | 8/1959 | Fryklund | 340—3 |
| 2,946,980 | 7/1960 | Bridges et al. | 340—3 |
| 2,948,879 | 8/1960 | Padberg et al. | 340—3 |
| 2,852,676 | 9/1958 | Joy | 340—3 |
| 2,883,642 | 4/1959 | Kietz | 340—3 |
| 2,963,680 | 12/1960 | Beebe | 340—3 |
| 2,458,415 | 1/1949 | Peterson | 340—3 |
| 2,460,316 | 2/1949 | Trent et al. | 340—3 |

FOREIGN PATENTS

| | | |
|---|---|---|
| 740,512 | 11/1955 | Great Britain. |

RICHARD A. FARLEY, *Primary Examiner.*